United States Patent
Fletcher et al.

[11] 3,875,435
[45] Apr. 1, 1975

[54] HEAT OPERATED CRYOGENIC ELECTRICAL GENERATOR

[76] Inventors: James C. Fletcher, Administrator of the National Aeronautics and Space Administration, with respect to an invention of Taylor G. Wang, Glendale; Melvin M. Saffren, Altadena; Daniel D. Elleman, La Canada, all of Calif.

[22] Filed: Apr. 1, 1974

[21] Appl. No.: 457,295

[52] U.S. Cl. ................ 310/40, 310/52, 310/10, 310/4, 60/530, 60/516, 62/3, 62/467, 335/216
[51] Int. Cl. .................................. H02k 9/00
[58] Field of Search ............ 310/10, 40, 52, 4, 5, 6, 310/2; 322/2; 174/15 R; 60/516, 530, 531; 62/3, 467

[56] References Cited
UNITED STATES PATENTS

| | | | |
|---|---|---|---|
| 3,026,151 | 3/1962 | Buchhold | 310/40 |
| 3,504,868 | 4/1970 | Engelberger | 310/52 X |
| 3,593,110 | 7/1971 | Huebner | 322/2 |
| 3,620,033 | 11/1971 | Elsner et al. | 174/15 R X |
| 3,731,865 | 5/1973 | Wood | 310/52 X |
| 3,772,543 | 11/1973 | Woodson | 310/52 |
| 3,835,663 | 9/1974 | Appleton et al. | 310/52 X |

*Primary Examiner*—Donovan F. Duggan
*Attorney, Agent, or Firm*—Monte F. Mott; Paul F. McCaul; John R. Manning

[57] ABSTRACT

An electrical generator useful for providing electrical power in deep space, is disclosed. The subject electrical generator utilizes the unusual hydrodynamic property exhibited by liquid helium as it is converted to and from a superfluid state to cause opposite directions of rotary motion for a rotor cell thereof. The physical motion of said rotor cell is employed to move a magnetic field provided by a charged superconductive coil mounted on the exterior of said cell. An electrical conductor is placed in surrounding proximity to said cell to interact with the moving magnetic field provided by the superconductive coil and thereby generate electrical energy. A heat control arrangement is provided for the purpose of causing the liquid helium to be partially converted to and from a superfluid state by being cooled and heated, respectively.

18 Claims, 6 Drawing Figures

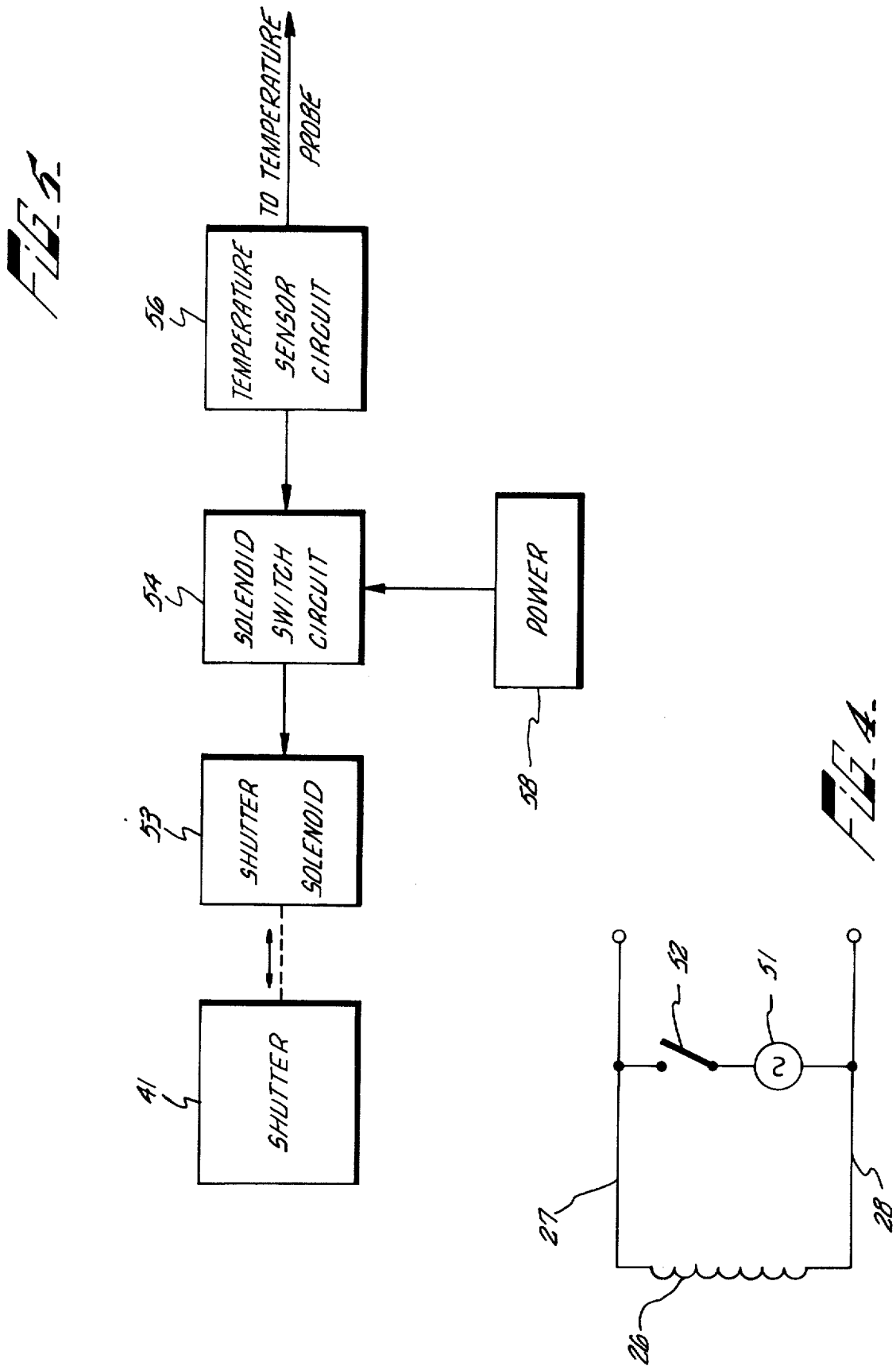

HEAT OPERATED CRYOGENIC ELECTRICAL GENERATOR

BACKGROUND OF THE INVENTION

1. Origin of the Invention

The invention described herein was made in the performance of work under a NASA contract and is subject to the provisions of Section 305 of the National Aeronautics and Space Act of 1958, Public Law 85-568 (73 Stat. 435; 42 U.S.C. 2457).

2. Field of the Invention

This invention generally relates to electrical generators. More specifically, the present invention concerns a heat operated and controlled device which is particularly adapted for use in the cryogenic environment of outer space.

3. Description of the Prior Art

Successive space missions have tended to become longer in duration and have involved travel to the outer regions of space. An example of such a mission would be the recent flyby of the planet Jupiter. Power for the spacecraft is normally provided by some form of electrical power source or generator on board the spacecraft.

As an example, batteries or generators which are operated by solar energy have been used; however, as future space-craft missions travel further from the sun, the efficiency of such generators and batteries will be greatly reduced due to the diminished exposure to solar energy.

The use of radioactive sources presents a promising alternative to solar cells and other solar-type generators that require exposure to the sun's rays. However, such radioactive sources require careful shielding and thus involves a weight penalty. Further, special spacecraft configurations to accommodate such shieldings, and to allow other physical isolation of scientific payloads from such radioactive sources, would be required.

It is accordingly the intention of the present invention to provide an electrical generator that is not subject to the limitations of requiring exposure to the sun or requiring special shielding and/or spacecraft configurations; but which is capable of providing electrical energy on a continuous basis.

OBJECTS AND SUMMARY OF THE INVENTION

Accordingly, it is an object of the present invention to provide an electrical generator that is capable of providing electrical power under the physical conditions which characterize outer space.

It is another object of the present invention to provide an electrical generator that would not require exposure to the sun or the incidence of solar energy for operation.

It is a further object of the present invention to provide a generator that would not require the special shielding and/or special spacecraft design attendant to the use of radioactive sources.

It is a yet further object of the present invention to provide an electrical generator that would not require recharging once the generator is charged and disposed in space.

Briefly described, the present invention involves a technique and apparatus that operates as an effective source of electrical power and which is particularly useful in connection with spacecraft traveling to outer space.

More particularly, the subject electrical generator includes a rotatably mounted container or rotor cell having a superconductive electromagnet mounted thereon. The rotor cell is filled with liquid helium and a suitable barrier material such as very fine particulate matter to prevent rotation of liquid helium in its normal state relative to the rotor cell and to permit rotation of liquid helium in its superfluid state relative to the rotor cell. An electrical conductor formed as a stator coil or the like is situated in surrounding proximity to the rotor cell to intercept lines of force produced by the resultant change in the magnetic field when the rotor cell is rotated.

The rotor cell is initially rotated in one direction by suitable means; e.g., by the application of alternating current (a.c.) to the stator coil. The helium within the rotor is then cooled until a portion of the liquid helium converts to the superfluid state. The rotor cell is then permitted to coast to a stop, for example, by disconnecting the a.c. source from the stator coil. The superfluid component of the helium has no viscosity and thus will continue to rotate independently of the rotation of the rotor cell. The normal component of the liquid helium has viscosity and is prevented from rotation relative to the rotor cell by the particulate material.

Suitable means are provided for converting liquid helium from the normal to the superfluid state, e.g., by removing heat from the cell and for converting liquid helium from the superfluid to the normal state, e.g., by adding heat to the cell. The conversion of superfluid helium to normal liquid helium decreases the mass of the superfluid component and of course increases the mass of the normal component. However, since the velocity of the superfluid component remains constant, the loss of momentum of the superfluid component is assumed by the rotor cell and the normal component. This conversion of momemtum results in the application of force to the rotor cell to cause the cell to rotate in the same direction as the superfluid component and at a velocity which results in the conservation of momentum. When normal liquid helium is converted to the superfluid state the newly added mass of superfluid assumes the same velocity as the existing superfluid component. Thus, the momentum of the superfluid component is increased. At the same time, the rotor cell and normal liquid helium is rotated in the opposite direction at a velocity sufficient to offset the momentum gain of the superfluid component.

The conversion of helium from the normal to the superfluid state and vice versa thus causes the rotor cell to oscillate. The oscillation of the rotor cell in turn causes the magnetic field produced by the electromagnet to oscillate relative to the stator coil and induce an electromotive force therein. The stator coil then functions as a generator winding to produce a source of electrical current therein for utilization by any suitable load.

Further objects and the many attendant advantages of the invention will be more readily appreciated as the same becomes better understood by reference to the following detailed description which is to be considered in connection with the accompanying drawings wherein like reference symbols designate like parts throughout the figures thereof.

BRIEF DESCRIPTION OF THE DRAWINGS

FIG. 4 is a schematic circuit diagram illustrating an auxiliary source of a.c. power and a switching arrangement which may be used to spin up the rotor cell to an initial velocity.

FIG. 5 is a schematic block diagram illustrating an exemplary shutter mechanism and circuit that would be suitable for use with the present invention.

DESCRIPTION OF THE PREFERRED EMBODIMENT

Figure 1:
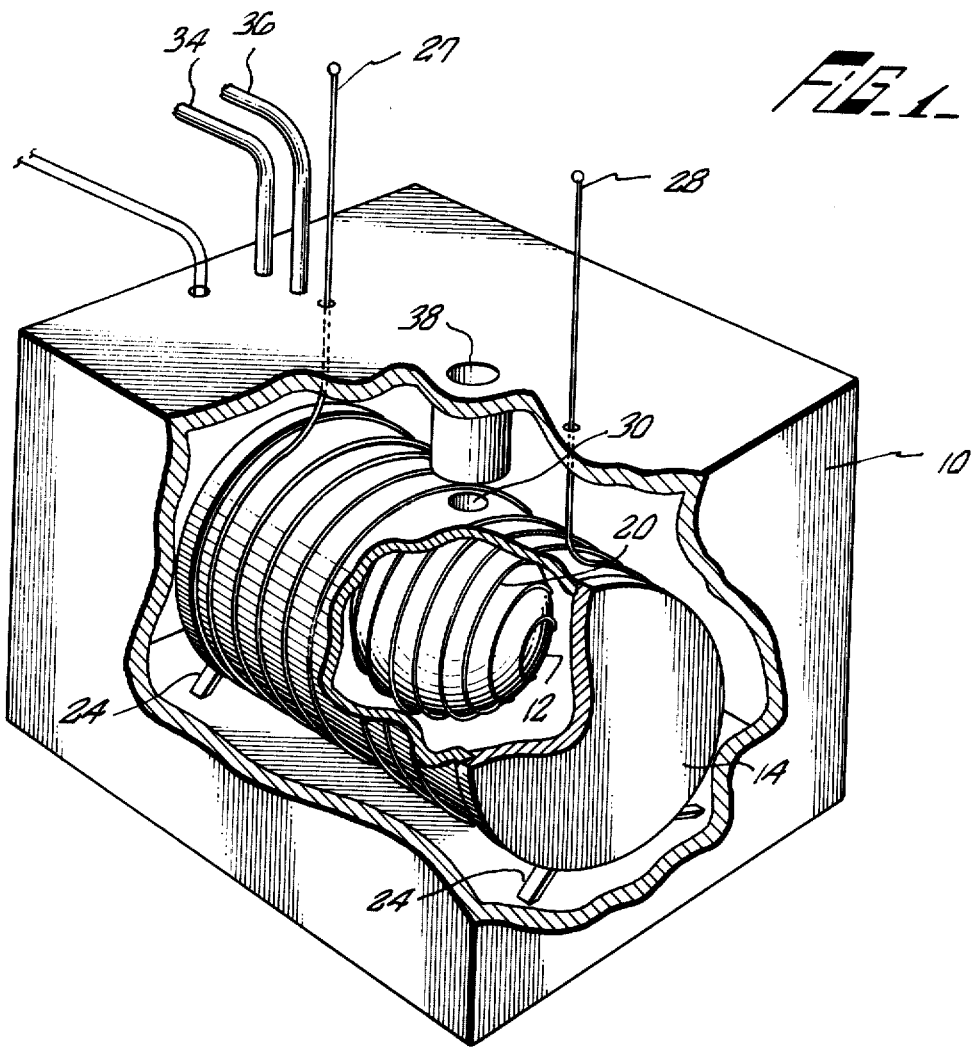
FIG. 1 is a schematic diagram illustrating a partially fragmented perspective view of an electrical generator in accordance with the present invention.
Figure 2:
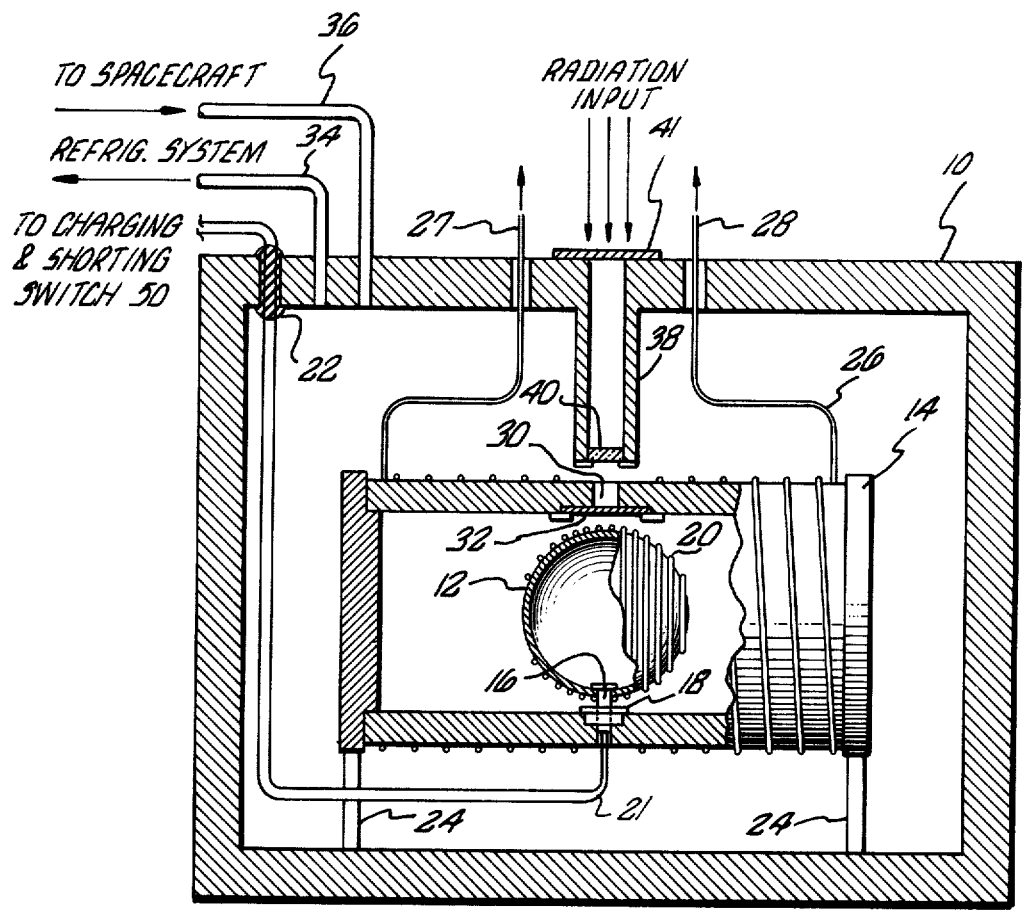
FIG. 2 is a schematic diagram illustrating a cross-sectional view of the electrical generator illustrated by FIG. 1.
Figure 6:
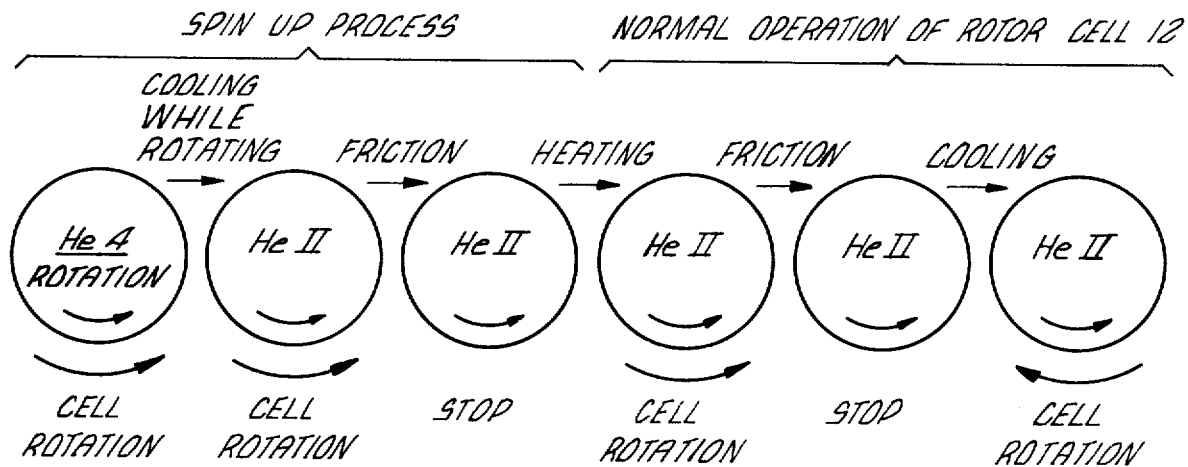
FIG. 6 is a series of graphic diagrams that are useful in explaining the physical motion of the rotor cell used in conjunction with the subject invention.

Referring to FIGS. 1 and 2 of the drawings, the present invention essentially includes a dewar 10 in which a rotatably mounted rotor cell 12 enclosed within a housing 14 is situated. As shown, the dewar 10 may be generally cubic in shape, the cell 12 spherical in shape, and the housing 14 generally cylindrical in shape. It will become clear from the following discussion that certain other configurations would be suitable and within the functional constraints of the subject invention.

The cell 12 is intended to be a thin walled container which is mounted on a suitable arrangement such as a pivot 16 and a bearing 18 so as to be rotatable within the confines of the housing 14 in which the cell 12 is encapsulated. A combination of fine particulate matter and liquid $He^4$, is confined in and fills the cell 12. The particulate matter may be aluminum oxide powder of a conventional and available fine grain size for preventing movement of the normal liquid helium relative to the cell and for permitting movement of superfluid helium relative to the cell. The exterior surface of the cell is provided with a closed superconductive coil 20 which is wound therearound for the purpose of providing a permanent electromagnet when the superconductive coil is charged. A pair of bypass leads 21 for the superconductive coil 20 may be drawn through the pivot 16 and an insulating washer 22 or the like situated in the wall of the dewar 10 by a suitable rotating electrical connection to permit initial charging of the superconductive coil 20 from outside the dewar 10.

The housing 14 is generally supported within the dewar 10 in any appropriate manner such as by the use of a plurality of supports 24. The housing 14 is filled with gaseous helium which surrounds the cell 12 and acts as a heat transfer medium between the liquid helium contained by the cell 12 and liquid helium contained within the dewar 10. As shown, the exterior surface of the housing 14 is provided with a coiled electrical conductor 26. The two ends 27 and 28 of the conductor 26 are extended through the wall of the dewar 10 and serve as output terminals at which electrical energy is provided by the subject generator. Functionally, the electrical conductor 26 may be considered to serve as a stator winding.

An aperture 30 sealed by a transparent window 32 is provided in the wall of the housing 14 at a suitable location thereon to permit radiation that is allowed to enter the dewar 10, as hereinafter explained, to irradiate the cell 12 and thereby heat the contents thereof.

As earlier mentioned, the dewar 10 serves to contain the above-described cell 12 and housing 14. The liquid helium that is contained by the dewar 10 may be provided through appropriate hoses 34 and 36 which are connected to the conventional refrigeration system normally present on a spacecraft (not shown) to provide any desired cooling. The apparatus for providing the liquid helium to the dewar 10 is understood to be of conventional nature and further description thereof for the purposes of the subject invention is believed to be unnecessary for the purpose of a concise description of the invention.

As shown, a windowed tubular portal 38 is provided through one wall of the dewar 10 for the purpose of permitting radiation external to the dewar 10 to irradiate the cell 12 at controlled intervals. A transparent window 40 is used to seal one end of the tubular portal 38. The portal 38 and window 40 thereof are aligned with the aperture 30 and window 32 provided in the wall of the housing 14 to permit external radiation entering the portal 38 to pass through the windows 40 and 32 to irradiate the cell 12. A shutter 41 is situated at the outer end of the tubular portal 38 to block the entrance of radiation when the shutter 41 is positioned to cover the portal 38 as shown in FIG. 2. Clearly, when the shutter 41 is removed by any suitable method such as with the simple mechanism illustrated by FIG. 4, radiation would be permitted to pass through the portal tubing 38, window 40, aperature 30, window 32, so as to irradiate the cell 12.

Figure 3:
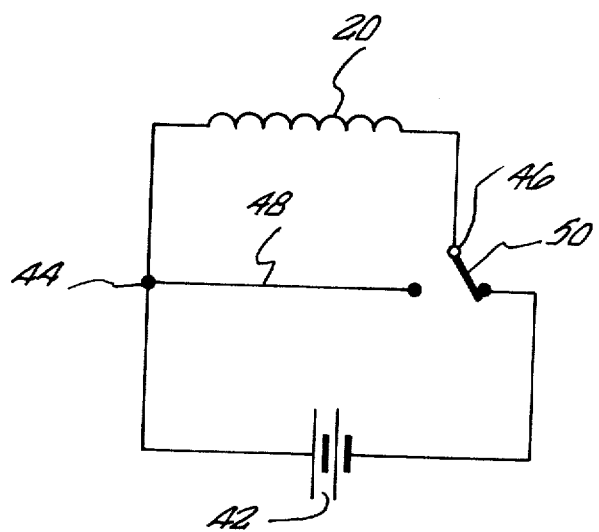
FIG. 3 is a schematic circuit diagram of a current source and switching arrangement that may be used to charge the superconductive coil carried by the rotor cell of the generator.

Charging of the superconductive coil 20 to form an electromagnet may be accomplished in any conventional manner. As an example, the circuitry of FIG. 3 illustrates that a power source 42 may be connected between terminals 44 and 46 of the superconductive coil 20 to have current flow occur through the superconductor. At such time as the maximum current flow through the superconductor is attained, the superconductor is considered to be charged. A superconducting shorting lead 48 may then be connected to short circuit the terminals 44 and 46. The power source 42 would be concurrently disconnected. A switch 50 may be used for such purposes. It is to be understood that any other way of charging the superconductive coil 20 may be used to obtain the flow of persistent current therethrough. Of course, the charging of the superconductive coil 20 may be accomplished while the spacecraft bearing such invention is on the ground.

The rotor cell 12 may be rotated to provide an initial velocity to the superfluid helium by connecting the stator coil 26 across a suitable source of a.c. power 51 as is illustrated in FIG. 4. After the rotor cell has achieved the desired velocity, the a.c. source 51 may be disconnected from the stator coil 26 by switch 52. The rotor cell is then allowed to coast to a stop and operation of the unit as an electric generator can commence as will be described in more detail. It should be noted that in the event that the magnetic field created by the superconductive coil 20 is aligned with the magnetic field produced by the stator coil 26, an external magnet or other suitable means may be used to move the rotor cell off dead center and start the rotor cell rotating.

Referring to FIG. 5, the shutter 41 for controlling heat input to the rotor cell 12 may be mechanically connected to a solenoid 53, or the like. The solenoid 53 is connected to move the shutter 41 between two positions required to cover and uncover the tubular portal 38 to respectively prevent or permit the entry of external radiation. The solenoid 53 may be simply controlled by a solenoid switching circuit 54 that is responsive to a switching signal provided by temperature sensing circuit 56. A suitable temperature probe or transducer (not shown) may be placed adjacent to or within the cell 12 to provide an appropriate electrical signal representative of the temperature of the liquid helium within the cell 12. The solenoid 53 and the solenoid switching circuit 54 may be incorporated as a single unit in any of the manners that are well known in the art.

The temperature sensing circuit 56 serves to provide a first output signal to the solenoid switching circuit 54 to open the shutter 41 whenever the temperature of the liquid helium within the rotor cell 12 falls to a first predetermined value, e.g., 1.5°K. The temperature sensing circuit may provide a second output signal to circuit 54 to close the shutter 41 when the temperature of the helium within the cell 12 reaches a second predetermined value, e.g., 2.0°K. The refrigeration system of the spacecraft continually removes heat from the liquid helium within the cell 12. Thus the temperature within the cell 12 oscillates between the two predetermined values. A suitable power supply 58 to operate the solenoid 53 may obviously be connected through the switching circuit 54 or through any other well known technique.

The transition of liquid helium to and from the superfluid state is accomplished by the controlled cooling and heating of the liquid helium. Whenever the temperature of the liquid helium drops below its superfluid critical point, which is approximately 2.17°K, such transition starts to occur. The more the liquid helium is cooled, the greater will be the portion of the liquid helium that is maintained in a superfluid state rather than the normal state. Accordingly, for the purposes of the present invention, it is believed that an operating temperature range would be between 1.5°K and 2.0°K. As is well known, the background temperature of space is in the neighborhood of 4.0°K and is thus sufficiently high to provide necessary heat input to raise the temperature of the cell from its cooled condition at 1.5°K to its heated condition at 2.0°K.

As is also well known, liquid helium in a superfluid state behaves as though it is a mixture of two interpenetrating fluids each with its own density and velocity field. Liquid helium in the superfluid state has no viscosity while the liquid helium in the normal state has viscosity. Further well known is the fact that when transition takes place between the superfluid and normal states, momentum is conserved.

The operation of the generator during the initial spin up process and subsequent oscillatory motion is illustrated in FIG. 5. The rotor cell 12 is spun until it achieves a desired velocity by, for example, applying an a.c. current to the stator winding 26 while the rotor superconductive coil 20 is conducting current as was explained in conjunction with FIGS. 3 and 4. The rotor cell 12 is then cooled until a desired portion of the liquid helium is converted to the superfluid state (HE II). The source 51 is then disconnected from the stator winding 26. The friction of the bearing 18 is finite and will thus eventually stop the rotational movement of the cell 12. Drag forces created by interaction of helium gas within the housing 14 and the cell 12 will also provide breaking forces to the cell.

The cell 12 is now heated by means of the shutter 41 to convert a portion of the superfluid component to the normal component. The velocity of the superfluid component remains constant but its momentum decreases due to the loss of mass. The momentum lost by the superfluid component is transferred to the cell 12 since the normal component cannot rotate relative to the cell 12. Thus the cell 12 is caused to rotate in the same direction as the superfluid component so that the mass of the cell, and the normal component of the liquid helium times the velocity of the cell equals the momentum lost by the superfluid component. The cell 12 continues to rotate until it is stopped by friction, etc.

Heat is now removed from the cell 12 and portion of the normal component is converted to the superfluid component. This action increases the momentum of the superfluid component since its velocity remains constant. The increase in the momentum of the superfluid component is balanced by the momentum imparted to the cell 12 which rotates in the opposite direction of the superfluid component.

To summarize, conservation of momentum causes the cell 12 to physically rotate in the direction of the superfluid component when the cell 12 is heated and causes the cell 12 to physically rotate in a direction opposite to the superfluid component when the cell is cooled.

The intended operating temperature range for the rotor cell is below the critical point which is approximately 2.17°K and therefor a portion of the liquid helium will always be in the superfluid state. Thus, the above-described heating and cooling may really be considered to simply alter the amounts of liquid helium in the respective states, i.e., cooling causes increases in the amount of fluid in a superfluid state and a decrease in the amount of fluid in a normal state.

The rotor cell 12 is thus alternately heated and cooled within a narrow temperature range to cause the cell to oscillate about the pivot 16. Oscillating the cell 12 in opposite directions causes the magnetic field provided by the charged superconductive coil 20 to oscillate relative to the stator coil and thereby induce the flow of alternating current therein. Any suitable load may be connected across the output terminals 27 and 28 of the stator coil 26 to be energized by the alternating current. One complete oscillation of the rotor cell 12 corresponds in time to one cycle of the generated alternating current. The frequency of the alternating current may be controlled by the operating temperatures of the servo system of FIG. 5.

It is now clear from the foregoing description that the subject invention provides an electrical generator that is useful for providing electrical energy in outer space under the severe conditions of such environment without the need for exposure to solar radiation or the special configurations attendant to the use of radioactive materials.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. An electrical generator comprising:
   cell means;
   means for rotatably mounting the cell means;
   liquid helium disposed within the cell means, the cell means being arranged to prevent rotation of liquid helium in its normal state relative to the cell means and to permit rotation of liquid helium in its superfluid state relative to the cell means;
   magnetic means for providing a magnetic field which rotates with the cell means;
   at least one electrical conductor positioned in the proximity of the cell means for intercepting lines of force provided by the magnetic means when the cell means is rotated; and
   means for alternately converting liquid helium from the normal to the superfluid state and vice versa.

2. The generator defined by claim 1 wherein said cell means comprises a hollow sphere and including particulate matter disposed within the sphere to prevent rotation of liquid helium in its normal state relative to the sphere.

3. The generator defined by claim 2 wherein the means for mounting the cell includes a pivot attached to said sphere at a single point on the outer surface thereof, said pivot being mounted to be rotated.

4. The generator defined by claim 1 wherein the magnetic means includes a superconductive coil mounted on the outer surface of said cell means, said superconductive coil being charged to have persistent current flow through said coil.

5. The generator defined by claim 1 wherein the said electrical conductor is wound in a cylindrical configuration and maintained in surrounding proximity to said cell means.

6. The generator defined by claim 5 further including a cylindrical housing on the outer surface of which is mounted said electrical conductor, said cell means being contained within said cylindrical housing.

7. The generator defined by claim 6 wherein the housing is also filled with helium gas.

8. The generator defined by claim 6 wherein the cylindrical housing has an aperture in the wall thereof for exposing said cell means contained in said cylindrical housing to radiation originating from outside said cylindrical housing.

9. The generator defined by claim 1 wherein the means for converting liquid helium between the normal and superfluid states comprises a dewar enclosing the combination of said cell means, said magnetic means and said electrical conductor for providing a refrigerated environment in which liquid helium can be converted between normal and superfluid states.

10. The generator defined by claim 9 wherein the dewar includes shutter means for controllably admitting therein radiation originating from outside said dewar, radiation admitted into said dewar serving to irradiate said cell means for converting liquid helium contained therein from a superfluid state to a normal state.

11. The generator defined by claim 2 wherein the magnetic means includes a superconductive coil mounted on the outer surface of the sphere, said superconductive coil being charged to have persistent current flow through said coil.

12. The generator defined by claim 11 wherein the said means for converting liquid helium between the normal and superfluid states comprises a dewar enclosing the combination of said cell means, said magnetic means and said electrical conductor for providing a refrigerated environment in which liquid helium can be converted between normal and superfluid states.

13. The generator defined by claim 12 wherein the electrical conductor is wound in a cylindrical configuration and maintained in surrounding proximity to said cell means.

14. The generator defined by claim 13 further including a cylindrical housing on the outer surface of which is mounted said electrical conductor, said cell means being contained within said cylindrical housing.

15. The generator defined by claim 14 wherein the means for mounting the cell means includes a pivot attached at one end thereof to said sphere at a point on the outer surface thereof, said pivot being rotatably mounted at a second end thereof to said cylindrical housing.

16. The generator defined by claim 15 wherein the housing is also filled with helium gas.

17. The generator defined by claim 16 wherein the cylindrical housing has an aperture in the wall thereof for exposing said cell means contained in said cylindrical housing to radiation admitted into said dewar from outside said dewar.

18. The generator defined by claim 17 wherein the particulate material is aluminum oxide in granular form.

* * * * *